March 13, 1956  G. M. GLIDDEN  2,737,659
OPTICAL GAS MASKS
Filed Nov. 13, 1951
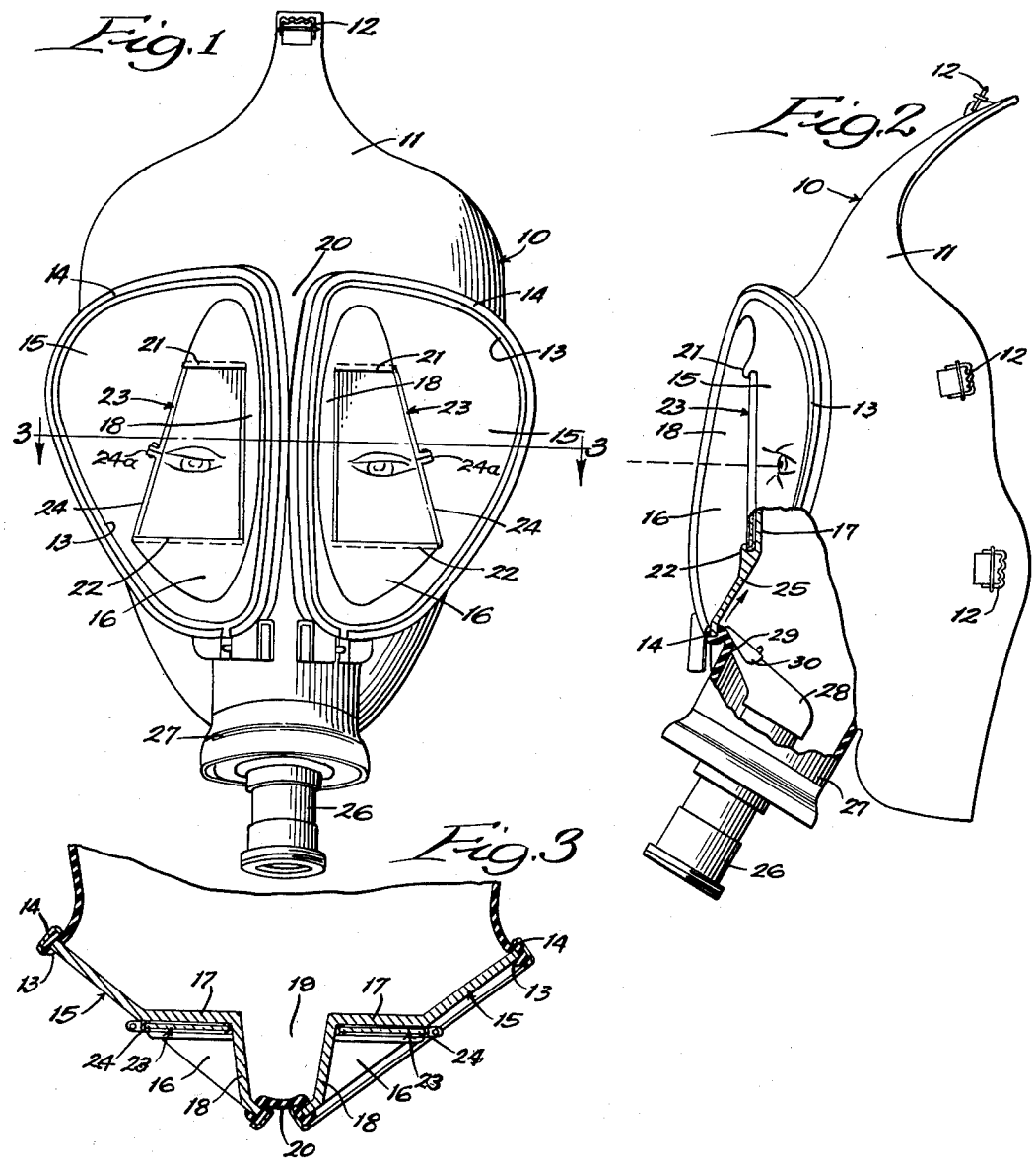
INVENTOR:
Galen M. Glidden,
BY
Dawson & Ormes,
ATTORNEYS.

United States Patent Office 2,737,659
Patented Mar. 13, 1956

2,737,659
OPTICAL GAS MASKS

Galen M. Glidden, Wheaton, Ill., assignor to Acme Protection Equipment Company, Chicago, Ill., a partnership Application November 13, 1951, Serial No. 256,015

3 Claims. (Cl. 2—14)

This invention relates to optical gas masks, and more particularly to the means employed in optical gas masks for the mounting of prescription lenses thereon.

Most gas masks are designed so that they fit snugly to the face of the wearer. It is therefore very difficult for a person wearing glasses to adjust the mask to his face to achieve the proper fit. Therefore, various means are employed for adapting the gas mask to correct the vision of the wearer. One of these means which has met with some success is the provision of clip inserts containing prescription lenses and adapted to fit in the inside of the face piece behind the windows of the mask and in alignment with the eyes of the wearer. However, when the prescription lenses are positioned within the face piece they tend to fog up and to interfere with the vision of the wearer. Also, these clip inserts are only practical in gas masks having relatively small windows therein. When very large windows are employed, and especially large windows which cut across the normal lines of vision at oblique angles, there is great difficulty in mounting the prescription lenses within the face piece so that they will be in correct optical relation to the eyes of the wearer.

Practically all gas masks are constructed of a flexible material such as rubber so that they can be adjusted to faces of different widths. The face piece is generally of a face-conforming shape, that is, rounded or V-shaped with a window on each side thereof separated by a central strip of the flexible material. This provides for the flexing of the mask along a longitudinal line between the windows for adjusting the width of the mask. However, this means of adjusting the width of the mask presents a problem when it is desired to adapt such mask to carry prescription lenses for the correction of the vision of the wearer of the mask. The various types of fixed mountings for prescription lenses which have heretofore been provided are frequently turned out of proper alignment when the mask is used by a person having an unusually wide or narrow face. Furthermore, for good visibility the prescription lenses must be close to the eyes of the wearer, whereas the windows in gas masks are frequently at a considerably greater distance from the eyes of the wearer than the optimum distance for prescription lenses.

Because of the recent widespread use of gas masks in atomic energy plants, the problem of designing satisfactory optical gas masks has taken a new turn. It has been found that it is necessary to decontaminate the gas masks worn in atomic energy plants at intervals of at least once per day, and therefore provision must be made for the convenient removal of the prescription lenses from one mask and their insertion in a different mask. In other words, it is desired to supply the worker requiring corrected vision with a pair of optical gas mask lenses that can be inserted in any of the masks in use in the plant without changing the optical relation of the lenses to the eyes of the wearer.

It is therefore a general object of this invention to provide a means of adapting gas masks for the mounting of prescription lenses thereon which will substantially solve the above problems. More specifically, it is an object of this invention to provide a novel means for mounting prescription lenses on the outside of gas mask windows to overcome the problem of fogging. It is also an object of this invention to provide a means for mounting prescription lenses which will maintain the lenses in close spatial proximity to the eyes of the wear and lying in planes approximately perpendicular to the normal lines of vision. It is a still further object of this invention to provide means for mounting prescription lenses which will prevent the lenses from being turned out of proper alignment with the eyes of the wearer even though the face of the wearer is unusually wide or narrow. Further objects and advantages will appear as the specification proceeds.

This invention is shown in an illustrative embodiment in the accompanying drawing, in which—

Fig. 1 is a front perspective view of a gas mask embodying the prescription lens mounting means of this invention; Fig. 2, a side elevational view of the mask of Fig. 1 partially broken away to show the interior structure; and Fig. 3, a fragmentary cross-sectional view taken through the windows of the gas mask.

In the illustration given, the gas mask is designated generally at 10 and it includes a face piece 11 for snugly fitting over the face of the wearer. The face portion may be provided with a plurality of buckles 12 for receiving straps for securing the face piece to the face of the wearer.

As indicated more clearly in Figs. 2 and 3, the face piece 11 is generally V-shaped. The face piece 11 may be suitably moulded from rubber or other flexible material to permit it to adjust to the face of the wearer. On each side of V-shaped piece 11 there is provided a window opening 13 in alignment with the eyes of the wearer, as indicated in Figs. 1 and 2. Any suitable means can be provided about window openings 13 for supporting non-optical lenses. In the illustration given, there is provided rims 14 extending entirely around window openings 13. Normally, the non-optical lenses having their peripheries sealably received by rims 14 are constructed of flat sheets of window material, such as glass, Plexiglas, etc. This type of window is shown in my co-pending application United States Serial No. 729,951, filed February 21, 1947, now Patent No. 2,588,516, dated March 11, 1952. The cited co-pending application also shows in greater detail the construction of the mask illustrated herein for the purpose of showing an embodiment of this invention. However, it will be understood that the prescription lens mounting means described herein can be advantageously employed in a wide variety of gas masks, and particularly in those masks with face pieces of face-conforming shape (rounded or V-shaped) having means about the window openings therein for supporting the non-optical lenses with their outer edges considerably behind their adjacent inner edges, thereby causing the substantially straightforward lines of vision of the wearer to form acute angles with the planes of said lenses. For example, in the illustration given, as seen best in Fig. 3, rims 14 have their outer edges considerably behind their adjacent inner edges. Such rims can receive either flat or curved non-optical lenses.

The improved means of adapting gas masks for the mounting of prescription lenses thereon of this invention is based on the idea of substituting non-optical lenses of distinctive configurations for the plano-lenses heretofore employed. These new non-optical lenses are constructed to extend across the window openings and to be received by the support means about the openings. Referring to the drawing for purpose of illustration, lenses 15 are constructed in accordance with this invention, and illustrate the preferred lens shape. As seen more clearly in Fig. 3, lenses 15 are provided with bilateral indentations or recesses 16. Recesses 16 have the sides thereof lying in generally vertical planes. The rear sides 17 of recesses 16 extend inwardly toward the nose of the wearer in close spatial proximity to the eyes of the wearer and lie in planes approximately perpendicular to the substantially straightforward lines of vision, as indicated in Fig. 2. The forwardly-extending sides 18 of recesses 16 provide therebetween a space 19 to receive the nose of the wearer to permit the rear sides 17 to be closer to the eyes of the wearer. Preferably, forwardly-extending sides 18 diverge slightly from each other in the direction of the face of the wearer so that they will rest snugly against the nose of the wearer.

Between the lenses 15 there is provided the usual longitudinally-extending strip of flexible material designated as number 20 to permit the flexing of the mask along a longitudinal line between the lenses to adjust it to faces of different widths. It will be observed that because of the configuration of lenses 15 the flexing of the mask about a longitudinal axis passing through strip 20 will produce a minimum of change in the alignment of the rear sides 17 of recesses 16.

Any suitable means can be provided about the outer edges of rear sides 17 for supporting prescription lens inserts in generally parallel relation to the outer edges of the sides. Preferably, means are provided for slidably receiving the prescription lens inserts. In the illustration given, there is provided an upper support strip 21 and a lower support strip 22 having grooves therein to slidably receive the upper and lower edges respectively of prescription lens inserts 23. Prescription lens inserts 23 can be constructed in various shapes, but preferably they are quadrilateral as shown, and are equipped with rims 24 to protect the inserts and to provide a finger hold 24a. It will be understood that inserts 23 are to be ground or otherwise formed to the required shape for correcting the vision of the wearer. Thus, they may be plano-concave, plano-convex, or other suitable shapes.

It has been found preferable to construct lenses 15 so that the bottom portions 25, as seen more clearly in Fig. 2, gradually curve outwardly from the lower edges of rear sides 17 to rim 14. This curved shape of portion 25 cooperates with the air intake means to cause the incoming air to sweep over the entire inner surfaces of lenses 15, and thereby prevent the lenses from becoming fogged. In the illustration given, mask 10 is equipped with an air intake conduit 26 which is concentrically mounted within an air exhaust conduit 27. As shown more clearly in Fig. 2, air intake conduit 26 is received within an integral intake extension 28, which divides to provide an inlet opening 29 at the base of each of the lenses 15. Inlet openings 29 are equipped with scoop-type dead air check valves 30 which cooperate with the openings to direct the air against the bottom portion 25 of lenses 15, as indicated by the arrow in Fig. 2. The air is thus led to flow upwardly along the inner surfaces of bottom portions 25 and then along the inner surfaces of rear sides 17.

Operation

Masks of the type illustrated in the drawing or other masks can be constructed in standard sizes and equipped with the prescription lens mounting means of this invention. However, it is preferred that lenses of the distinctive configuration described herein be used in gas masks having window openings adapted to provide a relatively large unobstructed visual field for both eyes of the wearer. In other words, the preformed lens shapes of this invention can be used most satisfactorily in gas masks having large window openings which enable the wearer to look not only toward the front, but also toward the side.

Because of the variation in the position of the pupils of the eyes of the wearer in relation to the rear sides 17 of lenses 15 for different wearers of the masks, it is preferred to determine the optical centers of the lenses by placing the mask on the face of the wearer and proceeding to make the required measurements. In this way, the optical lens inserts 23 can be ground to provide the correct prescription for the eyes of the wearer, and it will be certain that the lenses will be in the correct optical position with respect to the eyes of the wearer in all masks of the same kind in which they are employed.

The worker will then be equipped with a set of prescription lens inserts 23. To put on a mask, it is only necessary for him to slide the inserts into position to convert the mask to an optical mask providing the correct prescription for his eyes.

While in the foregoing specification a specific embodiment of this invention has been set forth in considerable detail for purpose of illustration, it will be apparent to those skilled in the art that many of the details can be varied widely without departing from the spirit of the invention.

I claim:

1. In a gas mask including a face piece of face-conforming shape having window openings therein providing relatively large unobstructed visual fields and means about said openings adapted to support non-corrective lenses with their outer edges considerably behind their adjacent inner edges, thereby causing the substantially straight-forward lines of vision of the wearer to form acute angles with the planes of said lenses, the improved means of adapting said mask for the mounting of prescription lenses therein, comprising non-corrective lenses of window material extending across said window openings and received by said support means, said lenses having bilateral recesses therein with the sides thereof lying in generally vertical planes, the rear sides of said recesses extending inwardly toward the nose of the wearer in close spatial proximity to the eyes of the wearer and lying in planes approximately perpendicular to said substantially straightforward lines of vision, said rear sides extending outwardly to the plane of said window openings so that prescription lenses can be slidably received on said rear sides, and means about the outside surface of said rear sides for slidably receiving prescription lens inserts in substantially parallel relation to said outside surfaces.

2. In a gas mask including a face piece of face-conforming shape having window openings therein providing relatively large unobstructed visual fields and means about said openings adapted to support non-corrective lenses with their outer edges considerably behind their adjacent inner edges, thereby causing the substantially straightforward lines of vision of the wearer to form acute angles with the planes of said lenses, the improved means of adapting said mask for the mounting of prescription lenses therein, comprising non-corrective lenses of window material extending across said window openings and received by said support means, said lenses having bilateral recesses therein with the sides thereof lying in generally vertical planes, the rear sides of said recesses extending inwardly toward the nose of the wearer in close spatial proximity to the eyes of the wearer and lying in planes approximately perpendicular to said substantially straightforward lines of vision, said rear sides extending outwardly to the plane of said window openings so that prescription lenses can be slidably received on said rear sides, the forwardly-extending sides of said recesses providing therebetween a space to receive the nose of the wearer to thereby permit said rear sides to be closer to the eyes of the wearer, and means about the outside surface of said rear sides for slidably receiving prescription lens inserts in substantially parallel relation to said outside surfaces.

3. In a gas mask including a face piece of flexible material having a relatively large window opening therein on each side of said face piece in alignment with the eyes of the wearer, said window openings being spaced by a longitudinally-extending strip of flexible material, and means about said openings adapted to support non-corrective lenses with their outer edges considerably behind their adjacent inner edges, thereby causing the substantially straightforward lines of vision of the wearer to form acute angles with the planes of said lenses, the improved means of adapting said mask for the mounting of prescription lenses thereon, comprising non-corrective lenses of window material extending across said window openings and received by said support means, said lenses having bilateral recesses therein with the rear sides of said recesses extending inwardly towards the nose of the wearer in close spatial proximity to the eyes of the wearer and lying in planes approximately perpendicular to said substantially straightforward lines of vision, said rear sides extending outwardly to the plane of said window openings so that prescription lenses can be slidably received on said rear sides, and means about the outside surface of said rear sides for removably supporting prescription lens inserts in substantially parallel relation to said outside surfaces, said means including grooved support strips at the top and bottom of said rear sides arranged to slidably receive the corresponding edges of prescription lenses.

References Cited in the file of this patent

UNITED STATES PATENTS

| | | |
|---|---|---|
| 1,710,813 | Drager | Apr. 30, 1929 |
| 1,923,567 | Baker | Aug. 22, 1933 |
| 2,359,506 | Battley | Oct. 3, 1944 |

FOREIGN PATENTS

| | | |
|---|---|---|
| 855,009 | France | Jan. 29, 1940 |